(12) United States Patent  (10) Patent No.: US 7,438,446 B1
McCann  (45) Date of Patent: Oct. 21, 2008

(54) NIGHT LIGHT PROJECTOR

(76) Inventor: Judy McCann, 3224 Avenue L, Fort Worth, TX (US) 76105

( * ) Notice: Subject to any disclaimer, the term of this patent is extended or adjusted under 35 U.S.C. 154(b) by 231 days.

(21) Appl. No.: 11/485,661

(22) Filed: Jul. 13, 2006

(51) Int. Cl.
*H01R 33/96* (2006.01)

(52) U.S. Cl. ...................................... 362/341

(58) Field of Classification Search ......... 362/641–644; 353/72, 119
See application file for complete search history.

(56) References Cited

U.S. PATENT DOCUMENTS

| 3,310,360 | A | * | 3/1967 | Jarvis et al. | 352/104 |
| 3,598,986 | A | | 8/1971 | Love | |
| 3,756,710 | A | * | 9/1973 | Taylor | 353/43 |
| D243,877 | S | | 3/1977 | Dickson | |
| 4,163,998 | A | | 8/1979 | Anderson | |
| 4,549,250 | A | | 10/1985 | Spector | |
| 5,307,051 | A | | 4/1994 | Sedlmayr | |
| 5,517,264 | A | * | 5/1996 | Sutton | 353/119 |
| 7,329,035 | B2 | * | 2/2008 | Feliciano | 362/644 |

* cited by examiner

*Primary Examiner*—Sandra O'Shea
*Assistant Examiner*—James W Cranson
(74) *Attorney, Agent, or Firm*—Lawrence J. Gibney, Jr.

(57) ABSTRACT

This is a projector night light combination that allows an image to be projected along the surface of a wall to calm a child. The night light itself is not being claimed as they are plentiful in the prior art but a projector with a lens that can be turned off and on to soothe the fears of children is claimed.

4 Claims, 5 Drawing Sheets

NIGHT LIGHT PROJECTOR

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

This relates to providing a source of illumination during the night, particularly to ease or calm a child's fears. It will be included in a night light format and will project a friendly image on the wall.

B. Prior Art

There are many other prior art references to night lights in general, and a representative example of them includes Sutton, U.S. Pat. No. 5,517,264, which is a projector night light. In Sutton, this device projects an image on a remote surface such as a ceiling or a wall in the room in which the night light is located. However, the device in this case operates on a very different principle in that it can simply be used as a night light or a projector by moving a portion of the device so that it projects the desired image.

Another example in the prior art of a television and night light can be found at Love, U.S. Pat. No. 3,598,986. This is a lamp having an image or picture, which is illuminated when the lamp is lit. The lamp can be used as a night light or a television lamp.

BRIEF SUMMARY OF THE INVENTION

This is a night light and projection night light combination. It is designed to be plugged into the wall like any other night light and will likely have a rechargeable battery in the interior of the casing along with needed, appropriate wiring. The top of the casing rotates by means of a hinged surface that can be rotated to reveal a projector with an adjustable lens. The projector is able to project an image onto a wall. When the image no longer needs to be projected, the hinged surface is simply closed, and the device will operate simply as a night light.

It is an object of this device to have a combination night light and projection night light in one device, particularly to soothe the fears of children.

DETAILED DESCRIPTION OF THE EMBODIMENTS

Figure 1:
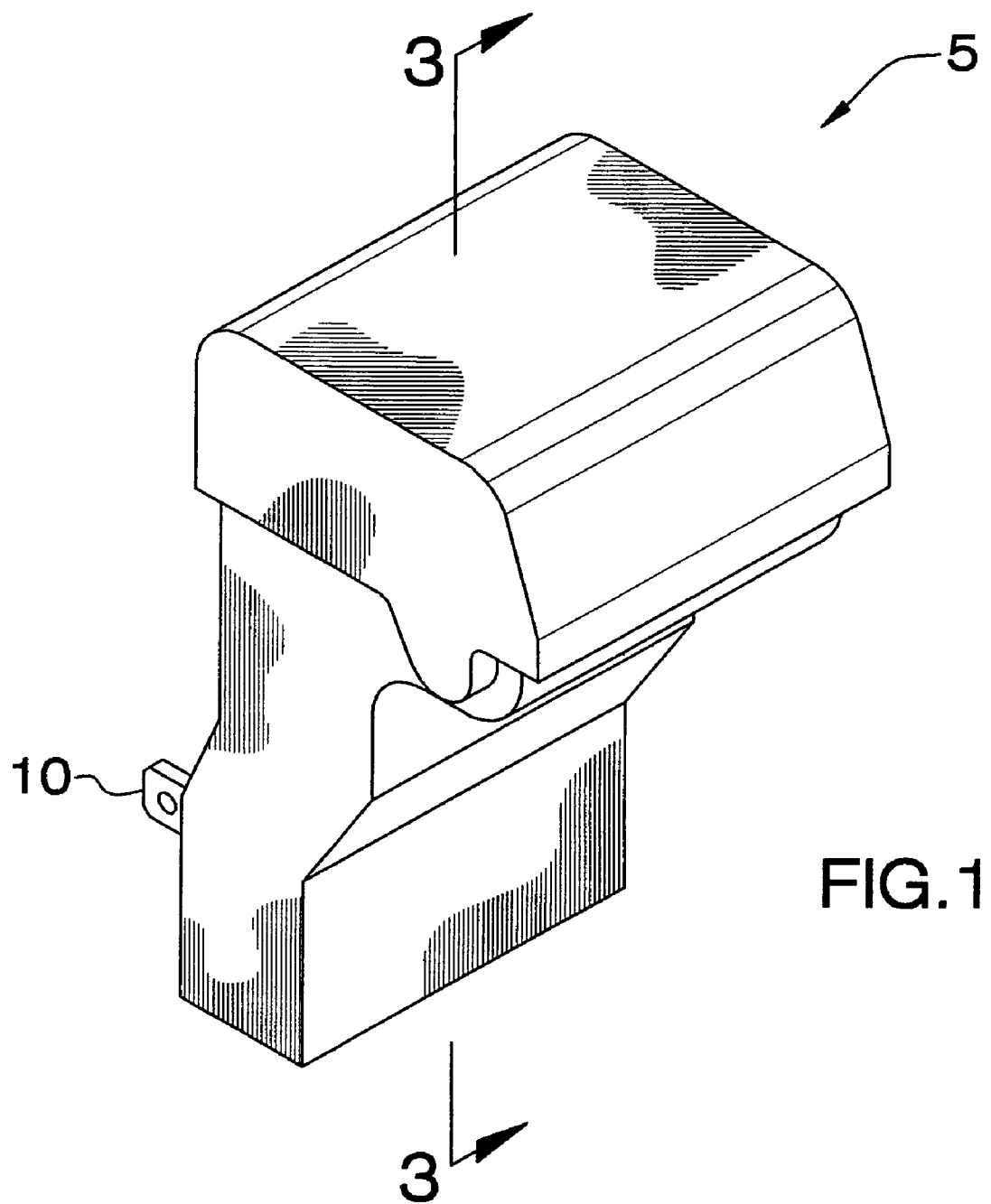
FIG. 1 is an isometric view of the device.

This night light 5 has a means to project an image on a wall 17. It will be plugged into a wall socket 10 using a set of prongs 10. FIG. 1 The device 5 will be comprised of an outer casing, which will probably be manufactured from plastic. Other materials may also be used.

When the device is not used, the top surface 15 is simply folded to fit flush against the top and cover the interior of the casing.

Figure 3:
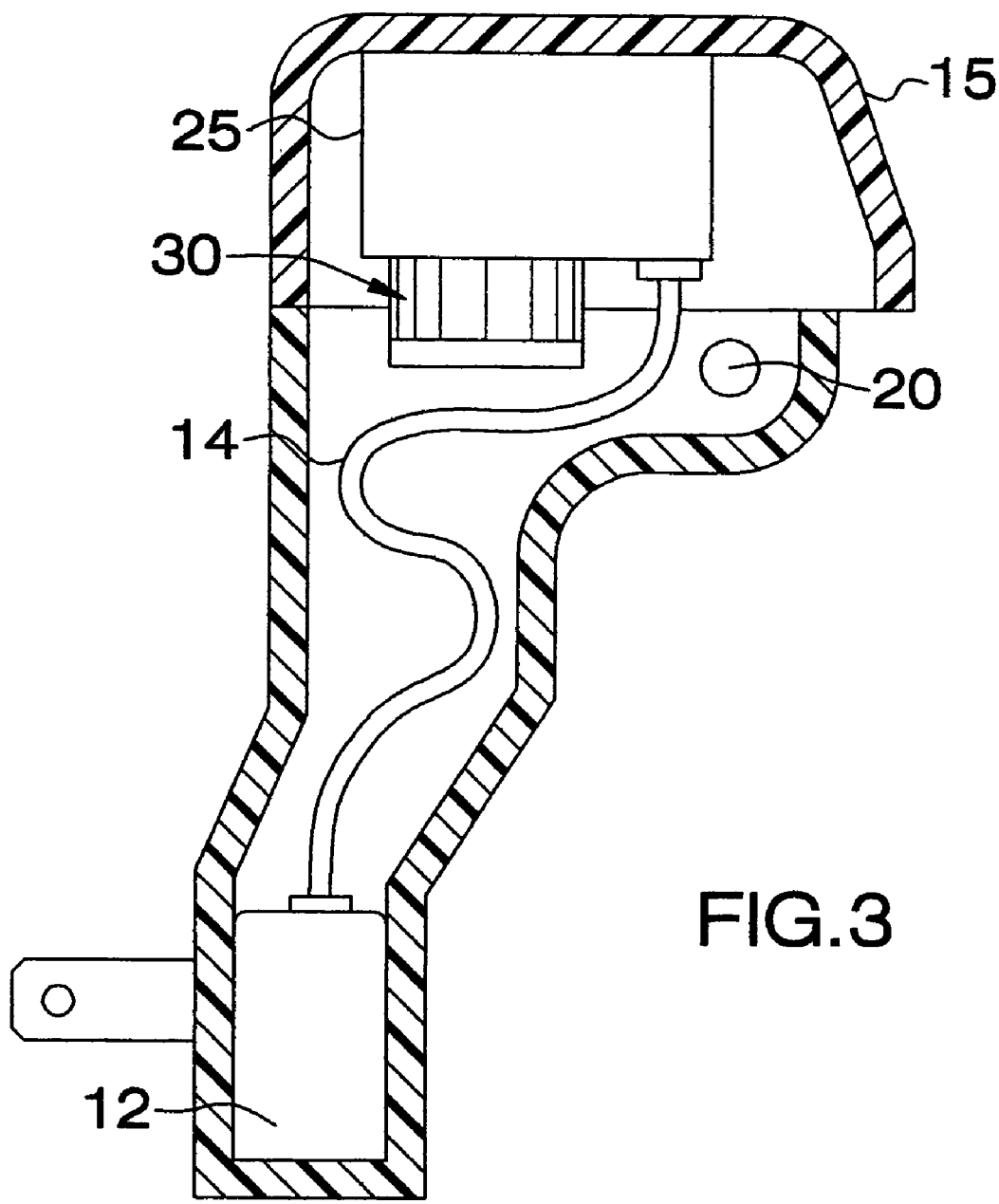
FIG. 3 is a view according to line 3-3 on FIG. 1.
Figure 4:
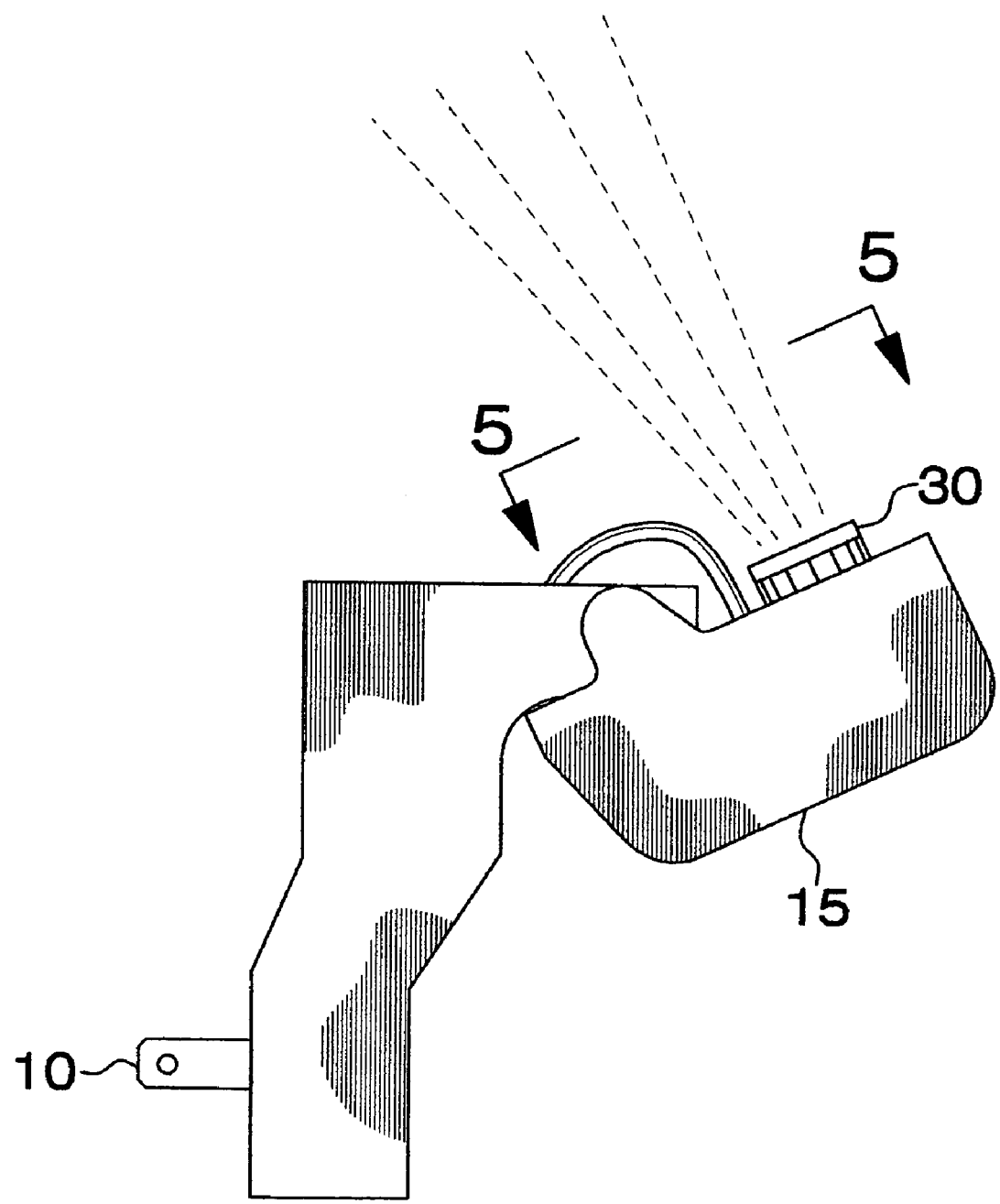
FIG. 4 is a side view of the device in use.

In the interior of the casing will be a power source 12 such as rechargeable battery with appropriate wiring 14. The wiring will lead from the power source 12 to the projector 25. FIG. 3 The projector 25 with the lens 30 will be secured to the interior surface of the outer casing 15. FIG. 3

Figure 5:
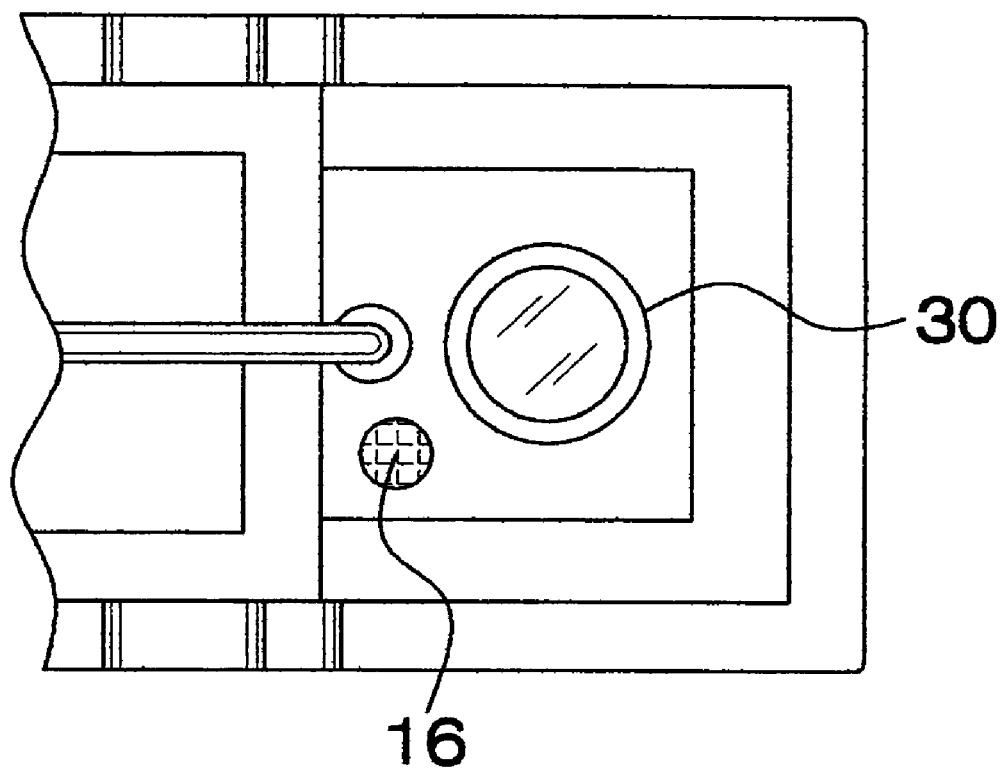
FIG. 5 is a view according to line 5-5 on FIG. 4.

Additionally, an on-off switch 16 will be provided in close proximity to the projector lens 30 so that the device can be turned off and on as desired. FIG. 5

When the device is not used as a projector it will function as a night light (not depicted). The night light by itself is not being claimed but the combination of the night light and projector is being claimed.

Figure 2:
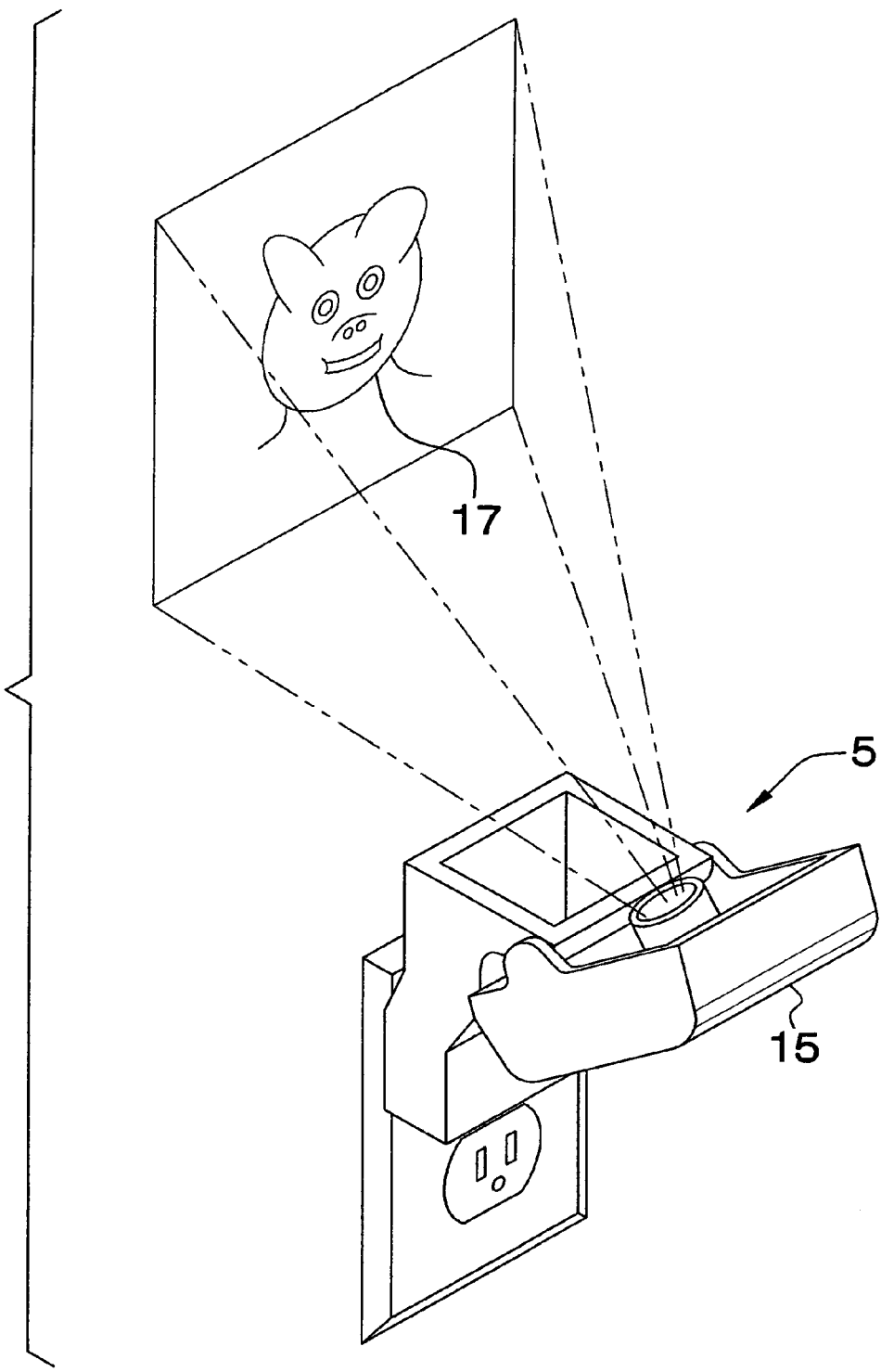
FIG. 2 is an isometric view of the device in use.

The casing is hollow to house and secure a projector 25 and lens 30, a rechargeable battery 12 and associated wiring 14. FIG. 3 The top portion 15 is secured to the body of the device with a hinge 20. The hinge 20 allows the top portion 15 of the device to rotate and expose the projector 30 and lens 25 to project a friendly image 17 on the wall. FIG. 2,4

The lens 30 for the projector will be adjustable and will project the image on the wall. The projector lens 30 is adjustable to achieve the clearest image.

The inventor claims:

1. A projector night light,
which is comprised of:
a. a casing;
wherein the casing is hollow;
said casing has a top section and a bottom section;
wherein the casing houses a projector;
wherein the casing houses a projector lens;
wherein the casing houses a power source;
wherein the casing houses wiring;
wherein the casing can be plugged into an electrical outlet;
b. a hinged surface;
wherein the top section and the bottom section are hinged together;
wherein the top section of a device will pivot around a hinge to open and close the device;
wherein the projector is secured to the interior of the top section;
c. an on-off switch;
wherein an on-off switch is provided in close proximity to the projector lens;
d. a projector;
wherein the projector is secured to the interior surface of the top section;
wherein the projector displays an image behind the device on a wall;
wherein a lens is provided with said projector;
e. power source;
wherein a power source is provided.

2. The device as described in claim 1 wherein the projector lens is adjustable.

3. The device as described in claim 1 wherein the power source is alternating current.

4. The device as described in claim 1 wherein a rechargeable battery is provided.

* * * * *